Patented Apr. 10, 1951

2,548,173

UNITED STATES PATENT OFFICE 2,548,173

PROCESS OF MAKING 5-NITRO-2-FURALDE-HYDE SEMICARBAZONE

Robert F. Raffauf, Norwich, N. Y., assignor to Eaton Laboratories, Inc., Norwich, N. Y., a corporation of New York No Drawing. Application July 19, 1946, Serial No. 684,767

7 Claims. (Cl. 260—345)

This invention relates to nitrofurans and aims to provide an improved process of making 5-nitro-2-furaldehyde semicarbazone.

In the past, aldehyde semicarbazones have been prepared by causing the aldehyde to react with semicarbazide hydrochloride in a solution buffered with a salt such as sodium acetate. The application of this process to the manufacture of 5-nitro-2-furaldehyde semicarbazone would necessitate the preparation of 5-nitro-2-furaldehyde. This is accomplished by hydrolysis of 5-nitrofurfural diacetate.

The preparation of 5-nitrofurfural diacetate is known (see Gilman and Wright, J. A. C. S. 52: 2550, 4165 (1930)). The hydrolysis of that material is described by Gilman in J. A. C. S. 52: 2552 (1930). This hydrolysis involves the use of 30% sulfuric acid at high temperature in the presence of a stream of carbon dioxide; extraction of the hydrolysate with relatively large quantities of ether; and drying of the ether extracts and removal of the solvent by distillation. An impure, dark brown product is obtained which must be purified by distillation and crystallization of the distillate under very carefully controlled conditions. The yield is about 75%.

I have discovered that 5-nitrofurfural diacetate can be caused to react with semicarbazide hydrochloride to produce 5-nitro-2-furaldehyde semicarbazone. The hydrolysis of the 5-nitrofurfural diacetate as a separate step is unnecessary and is dispensed with.

My invention not only eliminates the rather considerable expense of, and time required for hydrolyzing the 5-nitrofurfural diacetate, but also results in a much higher yield of 5-nitro-2-furaldehyde semicarbazone.

5-nitrofurfural diacetate and semicarbazide hydrochloride are caused to react to produce 5-nitro-2-furaldehyde semicarbazone in accordance with my invention by bringing them together in the presence of water and a catalyst and under the influence of heat.

The catalyst which I use in the practice of my invention is a strong mineral acid, preferably sulfuric acid. Other acids which can be used include nitric acid, hydrochloric acid and phosphoric acid. The acid concentration in the reaction mixture can be very low. I have found that the reaction can be caused to proceed smoothly with as little as 1% of catalyst. I prefer, however, to use about 5% of catalyst. The catalyst is added to a sufficient quantity of water to dissolve the semicarbazide hydrochloride used.

A solution of semicarbazide hydrochloride in water containing the catalyst is prepared and 5-nitro-2-furaldehyde diacetate is added to that solution. The mixture is heated, with stirring, until a temperature within the range of 80° C. to 90° C. is reached at which point the reaction begins. After the reaction has started, it will continue to completion without external heating. The reaction can be initiated at a temperature above 90° C. but it is then too vigorous for easy control. Upon the completion of the reaction, the temperature of the reaction mixture falls to below 75° C. The reaction mixture can then be cooled and filtered.

I have found that preparation of the reaction solution is facilitated by the addition to the solvent water of a quantity of ethyl alcohol. The addition of about one part of ethyl alcohol to each eight parts of water used gives good results.

The practice of my invention is illustrated by the following example:

In a 5-liter, 3-necked, round-bottom flask equipped with a stirrer, thermometer and reflux condenser, are placed 1700 ml. of water, 200 ml. of ethyl alcohol, and 100 ml. (184.0 grams) of sulfuric acid. To this solution are then added 111.5 grams of semicarbazide hydrochloride and 243 grams of 5-nitrofurfural diacetate. Stirring is started and the flask is heated on a steam bath until the temperature of the reaction mixture reaches 85° C. The steam is then turned off and the reaction allowed to proceed with constant stirring until the temperature falls below 75° C. (ca. one hour). The reaction mixture is cooled with stirring to 20° C. and filtered by suction. The crystals are washed on the filter by gravity with 800 ml. of cold water followed by 200 ml. of ethyl alcohol. The crystals are dried by suction on the filter for one-half hour, then overnight at 50° C. Yield, 194 grams or 98%.

What I claim is:

1. The process of making 5-nitro-2-furaldehyde semicarbazone, which comprises adding 5-nitrofurfural diacetate to a solution of semicarbazide hydrochloride in water containing a catalyst consisting of a small percentage of a strong mineral acid, and supplying heat to said ingredients until they start to react.

2. The process of making 5-nitro-2-furaldehyde semicarbazone, which comprises dissolving semicarbazide hydrochloride in a mixture of about eight parts of water, one part of ethyl alcohol and a small percentage of a strong mineral acid, adding 5-nitrofurfural diacetate to the solution, and supplying heat to said ingredients until they start to react.

3. The process of making 5-nitro-2-furaldehyde semicarbazone, which comprises dissolving semicarbazide hydrochloride in a mixture of water, ethyl alcohol and a catalyst consisting of a small percentage of sulfuric acid, adding 5-nitrofurfural diacetate to the solution, and supplying heat to said ingredients until they start to react.

4. The process of making 5-nitro-2-furaldehyde semicarbazone, which comprises dissolving semicarbazide hydrochloride in a mixture of water, ethyl alcohol and a catalyst consisting of a small percentage of nitric acid, adding 5-nitrofurfural diacetate to the solution, and supplying heat to said ingredients until they start to react.

5. The process of making 5-nitro-2-furaldehyde semicarbazone, which comprises dissolving semicarbazide hydrochloride in a mixture of water, ethyl alcohol and a catalyst consisting of a small percentage of hydrochloric acid, adding 5-nitrofurfural diacetate to the solution, and supplying heat to said ingredients until they start to react.

6. The process of making 5-nitro-2-furaldehyde semicarbazone, which comprises dissolving semicarbazide hydrochloride in a mixture of water, ethyl alcohol and a catalyst consisting of a small percentage of phosphoric acid, adding 5-nitrofurfural diacetate to the solution, and supplying heat to said ingredients until they start to react.

7. The process of making 5-nitro-2-furaldehyde semicarbazone, which comprises dissolving semicarbazide hydrochloride in a mixture consisting of about eight parts of water, one part of ethyl alcohol and about 5% of sulfuric acid, adding 5-nitrofurfural diacetate to the solution, and then supplying heat to said ingredients until they reach a temperature between 80° C. and 90° C.

ROBERT F. RAFFAUF.

REFERENCES CITED

The following references are of record in the file of this patent:

UNITED STATES PATENTS

| Number | Name | Date |
|---|---|---|
| 2,416,234 | Stillman et al. | Feb. 18, 1947 |

OTHER REFERENCES

Gilman et al., Journal of Amer. Chem. Society, vol. 52, pp. 2552–2553, 1930.

Chemical Abstracts, vol. 34, page 1937, paragraph 2.